United States Patent

Hill

[15] 3,652,420
[45] Mar. 28, 1972

[54] CLEANSER COMPOSITONS FOR ARTIFICIAL DENTURES AND METHODS OF PREPARING THE SAME

[72] Inventor: William H. Hill, Stamford, Conn.

[73] Assignee: Peter, Strong & Company, Inc., New York, N.Y.

[22] Filed: May 27, 1968

[21] Appl. No.: 732,086

Related U.S. Application Data

[63] Continuation-in-part of Ser. No. 385,029, July 24, 1964, abandoned.

[52] U.S. Cl...............................252/101, 252/104, 252/143, 252/152, 252/153, 252/161
[51] Int. Cl. .........................................................C11d 7/54
[58] Field of Search...................252/100, 99, 104, 101, 143, 252/145, 153, 161, 316; 424/56

[56] References Cited

UNITED STATES PATENTS

| | | | |
|---|---|---|---|
| 2,201,098 | 5/1940 | McKim | 252/143 X |
| 2,629,696 | 2/1953 | Dodd et al. | 252/136 |
| 2,672,449 | 3/1954 | Snell et al. | 252/100 |
| 3,075,923 | 1/1963 | Berst et al. | 252/144 |
| 3,218,263 | 11/1965 | Boyle et al. | 252/305 |

FOREIGN PATENTS OR APPLICATIONS 812,745  3/1959  Great Britain.........................252/145

Primary Examiner—Leon D. Rosdol
Assistant Examiner—P. E. Willis
Attorney—Frank H. Wisch

[57] ABSTRACT

A glass-clear gel medium is provided, in which medium free acid is distributed and which is highly effective in denture cleansing for the removal of tartar and other oral deposits. Processes are employable in producing an acidic gel in which various combination of ingredients such as acids, solvents, surfactants, and gelling agents are usable.

14 Claims, No Drawings

CLEANSER COMPOSITONS FOR ARTIFICIAL DENTURES AND METHODS OF PREPARING THE SAME

The present application is a continuation-in-part of application Ser. No. 385,029 filed July 24, 1964 (now abandoned).

The present invention relates to improved denture cleansers and to improvements in methods of preparing them. More particularly, the invention relates to highly effective cleansers in which constituents are so combined that products are provided with outstanding characteristics from the standpoint of attractiveness as saleable goods and convenience in application, as well as effectiveness in the cleansing of dentures.

Acid cleansers for dentures have long been proposed and produced in liquid form and as pastes but have not proven sufficiently satisfactory. Acid cleansers in liquid form are less desirable than those in thickened or paste forms, since the liquid is apt to drip or to be spilled, and when spattered onto clothing or other materials is frequently likely to cause irreparable damage. Acid cleansers in thickened form have generally not been prepared without difficulty or as sufficiently stable and aesthetically attractive products for use by consumers.

An object of the present invention is to provide improved denture cleanser products and methods of preparing the same. A further object is to provide a denture cleanser with preferred characteristics, and a preferred method of processing to reproduce such characteristics. More specifically, an object is to provide a stable, glass-clear, acid gel, free from syneresis, or objectionable odor or corrosiveness; harmless to dentures, textiles or human skin, without sting to the latter; and readily and easily removable, from plastic, metal, or other solid surfaces by rinsing, without leaving any undesirable after-taste. Another object is to provide an improved, transparent, bubble-free acid gel and improvements in methods of avoiding the presence of bubbles in acid gels.

It has, in the past, been relatively simple to make a gel or an acid gel, but relatively difficult to provide a gel product with more of the essentially desirable characteristics all combined in the same product, as herein described, having sufficient acid strength to clean denture surfaces thoroughly and to remove mucin plaques and other oral deposits.

The gel described and claimed hereinbelow meets a real need in the lives of many individuals so situated that sufficient time or a certain desired privacy appears to them to be unobtainable for attending to personal matters such as the cleansing of removable dentures. It is now possible for a person in a short available time during a busy day or at a place of employment, to apply the gel from a tube to a denture and to rub the gel over the surfaces (with the fingers, if desired) in a matter of seconds. Without delay, the applied gel is quickly removed, and with increased speed, from the denture by a stream of water, under a faucet, for instance. Oral deposits including food particles, stains or discoloring substances, and odor-causing bacteria on the denture are more completely removed as the water removes the gel. Brushing and overnight soaking are unnecessary. The freshly cleaned denture is then immediately in condition to be returned to the mouth.

Briefly, in an improved denture cleanser of the present invention, a preferred combination including an acid component, a solvent component, and a gelling component, is employed to obtain a product with a desired combination of characteristics. Surface activating effects are advantageously obtained with a selected acid component. Various surfactants are also found to be employable for obtaining a variety of effects and desired gel characteristics. Though the cleanser may vary in its characteristics and particularly in its consistency from relatively thin to relatively thick, and in clarity from clear transparent to translucent, constituents are brought together in preferred combinations and in preferred procedures primarily to obtain a homogeneous, glass-clear product with a preferred uniform gel structure. In a preferred form, the cleanser is a lastingly glass-clear polar gel in which free acid is distributed which is sufficient for removing tartar and other oral deposits in a denture cleaning operation which normally may require no longer than about two to five minutes.

Various acids are available that will dissolve and remove oral deposits from dentures. It is possible to obtain a thickened acid product with such acids as hydrochloric, sulfuric, nitric, phosphoric, acetic, formic, citric, hydrofluoric, fluoboric, fluosilicic, perchloric, and others, but the sulfonic acids have been found preferable in the product of the present invention from a number of standpoints, particularly in providing a glass-clear acid gel having the combined properties referred to above. An odorless, stable gel is more readily prepared with the latter acids, and is less apt to be corrosive. Many of the organo-sulfonics serve both as acid cleansers and as surfactants, and the gels containing them are more easily removable from denture surfaces by rinsing with tap water, without precipitation or deposition of insoluble alkaline earth salts, as well as without leaving an after-taste.

The aliphatic, long-chain alkyl sulfuric acids are other examples of useful acid substances which function in the gel both as acids and as surfactants, and can be used instead of the above-mentioned acids in making gels of the present invention. Specifically, lauryl sulfate, or products obtained by sulfating alcohols such as, lauryl, cetyl and oleyl alcohols, or their mixtures, may be mentioned.

It has been discovered in the development of a product of the present invention that sulfonic acids, such as, preferably, the so-called ABS acids, such as the product sold as LS–320, or specifically a nuclear long-chain alkyl benzene sulfonic acid, such as dodecyl benzene sulfonic acid, or other long-chain alkyl benzene sulfonic acids, have outstanding effects in the processes employed as noted hereinbelow, in providing glass-clear, acid gels.

Other sulfonic acids are specifically noted, as for example, sulfamic acid, benzene, toluene, and xylene sulfonic acids, and the like. Sulfonic acids with the following C and H groups, based on either propylene tetramer or dodecene, or n-paraffins, are usable:

$C_{10}H_{21}$
$C_{11}H_{23}$
$C_{12}H_{25}$
$C_{13}H_{27}$
$C_{14}H_{29}$
$C_{15}H_{31}$

At least one acid is used in the gel. However, mixtures of acids mentioned above are noted for use, as for example, hydrochloric acid and sulfonic acid such as dodecyl benzene sulfonic acid, and mixtures of other acids.

Sulfonic acid products, which are usable, are made from "-Neolene" (LS–320), and "Nalkylene" (SA–597), by Continental Oil Company. The typical alkyl group distribution of LS–320, based on propylene tetramer or dodecene, is:

| | |
|---|---|
| $C_{10}H_{21}$ | 4.5% |
| $C_{11}H_{23}$ | 25.9% |
| $C_{12}H_{25}$ | 53.4% |
| $C_{13}H_{27}$ | 11.7% |
| $C_{14}H_{29}$ | 3.4% |
| $C_{15}H_{31}$ | 2.0% |

The typical alkyl group distribution of SA-597, based on n-paraffins, is:

| | |
|---|---|
| $C_{10}H_{21}$ | 13.9% |
| $C_{11}H_{23}$ | 40.8% |
| $C_{12}H_{25}$ | 35.9% |
| $C_{13}H_{27}$ | 8.9% |
| $C_{14}H_{29}$ | 0.5% |

In the application of biodegradable agents, n-dodecyl benzene sulfonic acid or similar compounds in which the alkyl group is a straight-chain alkyl, rather than a heavy-branching chain such as tetrapropyl, are useful. Also, lauryl sulfates, and sulfonated straight-chain hydrocarbons, free of branched-chain, cyclic or aromatic compounds, and with average chain lengths of 10 to 18 carbon atoms are noted. So-called "keryl"

benzene sulfonate, may also be mentioned. This is made from a refined kerosene fraction which is used to alkylate benzene, the alkylated product then being sulfonated.

Straight-chain hydrocarbons of various chain lengths and of high quality obtained from petroleum are used to produce alkane sulfonic acids, which may be used in the acid gel.

The solvent component includes at least one of the mono and polyhydric alcohols. Monohydric alcohols such as ethyl, isopropyl, normal butyl, secondary butyl, tertiary butyl, methyl isobutyl, primary amyl, hexyl, isooctyl, decyl, dodecyl, tridecyl, 2-octyldodecyl ("Eutanol" G sold by Henkel International GMBH of Dusseldorf, Germany), and 2-ethylhexyl alcohols; polyhydric alcohols, such as ethylene and propylene glycols of various chain lengths, their esters, and their ethers, such as ethylene glycol monoethyl ether ("Cellosolve"), diethylene glycol monoethyl ether ("Carbitol"), propylene glycol methyl ether, dipropylene glycol methyl ether, glycerine, sorbitol, mannitol, pentaerythritol, polyethylene glycol, polypropylene glycol, and others are noted as solvents.

Mixtures of two or more alcohols, be they monohydric or polyhydric alcohols; mixtures of lower alcohols, mixtures of higher alcohols, or mixtures of lower with higher alcohols, are noted as ingredients of the solvent component. The higher alcohols have a tendency to exercise a greater solvent effect on tobacco stains or tars. Lower alcohols, however, are easier to rinse off with water. Where alcohols in their pure state are solids, they are preferably used in combination with another alcohol or other alcohols in such proportions that the resulting combination is a mixture that is liquid at or near room temperatures. Although at least one polar solvent may be used in the composition, mixtures of solvents are advantageously usable. Combinations of propylene glycol with isopropanol and other monohydric alcohols have provided particularly outstanding results and are preferred for use. Also, combinations of glycerine with isopropanol and other monohydric alcohols have given equally good results.

An aqueous-alcoholic solvent is generally used to advantage. Water, when included in certain proportions, improves the gel formation and structure. The solvent component serves not only as a thinner but also in the deaeration of the gels. It is found that thinning for the purpose of deaeration can be effected while avoiding syneresis in a final product. A range of proportions of water and other solvents applicable to various possible combinations of ingredients cannot be definitely stated. It differs for each different combination. Too little water as well as too large amounts of water tend to thin out the gel. Too much organo solvent tends to thin out a gel and to produce and increase haze, and to increase syneresis on standing. Some water is believed to be preferable for good gel formation.

Various surfactants, including the nonionics, anionics and cationics, as noted hereinbelow, are introduced, if desired, and in certain instances as auxiliary agents which may serve to effect thickening of a gel and to improve gel structure, though good gels are obtained in certain cases without auxiliary surfactants. Usually a dispersible or preferably a compatible surfactant is included to effect more thorough removal of the cleanser by rinsing.

Triethanolamine is advantageously utilized by including it in a formulation in which the sulfonic acids, or specifically alkyl benzene sulfonic acids, are used in the acid component. The triethanolamine salt may be added to a formulation as such, or it may be formed in situ while leaving an excess of the acid as free acid in the acid component. The substitution for triethanolamine of mono- or diethanolamine, any one of the isopropanolamines, n-propylamine, n-hexylamine, morpholine, is noted.

In the gelling component for obtaining a gel of a desired consistency in formulations herein presented a thermally produced silica is found to provide products unexpectedly superior to products obtained with, for instance, "Carbopol" 934, said to be carboxypolymethylene (sold by B. F. Goodrich Chemical Co.), or Na carboxymethyl cellulose. "Carbopol" 940 and 941 are other members of the "Carbopol" group said to include carboxy vinyl polymers. The materials of the Carbopol group are also said to be polymers of acrylic and/or methacrylic acid, in turn said to be made by polymerization or co-polymerization of the corresponding methyl esters and subsequent saponification of the polymers.

"Cab-O-Sil" (made by Godfrey L. Cabot, Inc.) not only provides a gelling effect but also transparent, crystal-clear cleanser products with said formulations as presented hereinbelow. It is a colloidal, submicroscopic, pyrogenic silica prepared in a hot, gaseous environment by a vapor-phase, flame hydrolysis, at high temperature (1,100° C.), of a silicon compound, such as silicon tetrachloride. It is distinct from silica gel obtained by precipitation of silicic acid from an aqueous silicate solution, and hardening of the precipitate. Silica gel, thus formed, is internally porous and is not adapted for use in the present preferred glass-clear, acid-gel product.

Cab-O-Sil contains no water-soluble inorganic salts. It is of high chemical purity, low water content, has enormous external surface area and no internal porosity. It has a high degree of particle separation and the particles are almost spherical in shape. The properties and composition of a grade of Cab-O-Sil are listed as follows:

| | |
|---|---|
| Silica content (moisture-free) | 99.0–99.7% |
| Free moisture (105° C.) | 0.2–1.5% |
| Ignition loss at 1,000° C. (excluding moisture) | 0.2–1.0% |
| CaO, MgO | 0.00% |
| $Fe_2O_3 + Al_2O_3$ | 0.01% |
| Particle size range | 0.015–0.020 micron. |
| Surface area | 175–200 Sq.m./gm. |
| Specific gravity | 2.1 |
| Color | white |
| Refractive index | 1.46 |
| pH (4% aqueous dispersion) | 3.5–4.2 |
| Apparent bulk density | 2.5–7.0 lb./cu ft. |

A finer grade of Cab-O-Sil has the above characteristics but a particle size range of 0.007–0.010 micron, a surface area of substantially 325 sq.m./gm., and a refractive index of 1.46.

The various grades of Cab-O-Sil may be used interchangeably as a dispersed phase in the acid gel.

The more nearly the refractive index of the Cab-O-Sil is approached by the refractive index of the liquid constituents or surrounding medium in the gel, the greater the likelihood of obtaining gel with combined characteristics referred to above, including the preferred glass-clear appearance. The refractive index of the continuous acid gel phase of a preferred product is in the range of 1.40 to 1.50. Gels are generally prepared having a refractive index of 1.46.

When a colorless gel product is desired, and when the alkyl benzene sulphonic acid, particularly a commercial grade of dodecyl-benzene sulfonic acid, or other sulfonic acid, is colored, it may be decolorized by means of hydrogen peroxide. The acid can be decolorized, for example, by diluting it in a solvent and treating the solution with hydrogen peroxide. The decolorizing may be accomplished in the process of making the gel. About 1 ml. of 30% hydrogen peroxide per 100 grams of gel, or per 35 grams of the acid, is approximately a sufficient proportion. When the proportion is too high, a gel after treatment is apt to contain bubbles. Varying amounts of hydrogen peroxide may be used. An excess, if left in a gel, has not only an effect in decolorizing a gel but also in decolorizing any stains on denture surfaces. The acidity of the gel and its alcohol or ether content serve to stabilize the hydrogen peroxide solution remaining in the product until it is put to use.

As a substitute for hydrogen peroxide, organic peroxides, such as benzoyl peroxide, are noted. Hydroperoxides, such as cumene hydroperoxide, are also mentioned.

Certain abrasives are noted as useful, particularly where a satisfactory gel product with relatively better clearness than expected is obtainable. A one or two percent (by weight) addition of finely ground pumice, figured on the basis of the total cleanser product, provides a clearer product, for instance, than the same addition of Dicalite (made by Great Lakes Carbon Corporation). In fine subdivision of about 200 mesh, a silica gel may be used, if desired, as an abrasive in an acid gel for providing a cleansing product substantially clearer than the gel made with common abrasives. Cab-O-Sil, while useful as a polishing agent, is not an abrasive.

In the method of preparation of the present product, certain sequences in the steps are found to yield more desirable results than others. With certain combinations of ingredients cleansers are made which have certain combinations of characteristics, referred to above, while other combinations of ingredients yield other combinations of those characteristics. A change of sequence in steps of preparation in each case changes the combination of characteristics of the product. For instance, a method employed comprises mixing a solvent and surfactant together, followed by adding and mixing in slowly the acid component and then the gelling component, stirring to remove bubbles and applying vacuum if necessary. A good gel cleanser is obtainable with different solvents, or surfactants or acids or gelling components. With certain preferred constituents a glass-clear gel is obtained. With others, the gel may not be clear but the gel will have combinations of the other desired characteristics.

ABS acid, or dodecylbenzene sulfonic acid, has a very pronounced effect on the viscosity of a Cab-O-Sil gel made with solvents used in the present process, such as, for example, propylene glycol, isopropanol and water. Instead of forming a crumbly, thick gel by initially mixing Cab-O-Sil with a mix of these solvents, a very thin fluid is preferably formed by mixing a very small amount of ABS acid with the solvent mix and then adding the Cab-O-Sil. The small amount of the acid, introduced as stated, is found to increase the reduction of viscosity more than expected. In this sequence, an undue stiffening may be avoided in an intermediate stage in the method of preparation. In subsequent stages the remaining portion of an acid component is added followed by addition of a decolorizing agent if needed, and addition of an auxiliary surfactant for adjustment of consistency, if desired.

A method, particularly where the sulfonic acids are used, comprises mixing together the acid and solvent components, stirring in the gelling agent, and then adding an amine to form an amine salt with part of the acid in situ. An auxiliary surfactant may finally be added if desired. A preferred procedure comprises including a surfactant or a portion of the sulfonic acid sufficient to avoid initial lumping when the gelling agent is added. Having added the remaining portion of the acid after the addition of the gelling agent, a bleaching agent may then be used to decolorize the mix if the sulfonic acid produces an undesired colored product. The amine and an auxiliary surfactant may finally be added as desired. This provides a glass-clear gel of preferred structure, and, as pointed out, the preparation of a gel with a complete combination of the desired characteristics is made possible.

A further method comprises a sequence of steps which is particularly advantageous in large-scale production. For instance, a solvent, such as isopropanol, is mixed with a portion of the entire amount of an acid agent, such as the above named Conoco SA-597, used in the product. Glycerine and distilled water are introduced and stirred into the first mix. The stirrer is kept at medium speed and "Cab-O-Sil" is gradually added until a thick gel without lumps is formed. Hydrogen peroxide is added to the gel and mixed in. Then the remaining portion of the acid is added while stirring. Triethanolamine (TEA) is added to the gel that has formed, while stirring, and thereafter the mix is allowed to cool (heat is generated on addition of the TEA). All entrapped air bubbles are removed by applying vacuum to a thin film-like, moving or flowing layer of the mix. A vacuum of at least 20 inches mercury is satisfactory. Tween 20 (polyoxyethylene (20) sorbitan monolaurate) or other hydrophilic surfactant having an HLB number above about 10, is thereafter mixed in until the batch is of uniform consistency. The initial portion of the acid is added to break down any early occurrence of agglomeration in the process. The Tween 20 serves to deagglomerate the mix when necessary, and causes a final thickening thereof.

In its preferred form, the product of this invention is a gel distinct from a salve or ordinary paste and distinct from a liquid or free-flowing substance. It is preferably a gel with the characteristics mentioned above, and which can be readily packed in, and dispensed from a squeeze-tube without causing a thinning during handling in trade and by the consumer. The gel for dispensing in tubes is a semisolid, homogeneous-appearing substance that appears to be elastic and jellylike or more or less rigid, and resistant to free-flow and yet spreadable in a layer at normal atmospheric temperatures and pressures. A gel has been defined as a disperse system consisting typically of a high molecular weight compound or an aggregate of small particles in very close association with a liquid. Products of the present invention have been prepared which are believed to come within the terms of technical definitions of gels.

The Table I below, includes a number of examples of formulations of cleansers that serve to illustrate the invention. Table II includes observations made as to characteristics of the products of these formulations after a period of six or more months. In each example, the same sequence of steps has been employed in preparing the product except as otherwise noted. The liquid components such as propylene glycol and the surfactant are mixed, the acid component is added while slowly stirring, the mixture is gently heated to about 50° C. Then the Cab-O-Sil is added, which is the grade first mentioned, though other grades may be used. The heating is continued, and the total mixture is occasionally stirred to expel the air bubbles as much as possible. The remaining air bubbles in some cases disappear of their own accord on standing. Vacuum is applied at times to such mixes to assist in removing bubbles. When the surfactant is a solid, it may be dissolved in the propylene glycol by heating, or it may be initially melted by heating.

TABLE I.

| Ex. No. | Solvent, amount | Surfactant, amount | Acid, amount | Cab-O-Sil, amount |
|---|---|---|---|---|
| 1 | Propylene glycol, 7 ml. | Dowfax 9N9, 10 ml. | Conoco 400, 2g. | 1.6 g. |
| 2 | Propylene glycol, 7 ml. | Dowfax 9N9, 10 ml. | Nacconol SZA, 2g. | 1.6 g. |
| 3 | Propylene glycol, 7 ml. | Dowfax 9N9, 10 ml. | Conoco LS-320, 2g. | 1.6 g. |
| 4 | Propylene glycol, 7 ml. | Dowfax 9N9, 10 ml. | p-toluene sulfonic acid, 1g. | 1.6 g. |
| 5 | Propylene glycol, 7 ml. | Dowfax 9N9, 10 ml. | benzene sulfonic acid, 1g. | 1.6 g. |
| 6 | Propylene glycol 7 ml. | Dowfax 9N9, 10 ml. | sulfamic acid, 1g. | 1.6 g. |
| 7 | Propylene glycol, 7 ml. | Tween 80, 10 ml. | Conoco LS-320, 2g. | 1.2 g. |
| 8 | Polypropylene glycol 7 ml. | Dowfax 9N9, 10 ml. | Conoco LS-320, 2g. | 1.6 g. |
| 9 | Propylene glycol, 7 | Ethofat 242/25, 10 ml. | Conoco LS-320, 2g. | 1.6 g. |
| 10 | Propylene glycol, 10 ml. | Ethomeen S/12, 10 ml. | Conoco LS-320, 15g. | 1.6 g. |
| 11 | Propylene glycol, 7 ml. | Brij 30, 10 ml. | Conoco LS-320, 2g. | 1.6 g. |
| 12 | Propylene glycol 10 ml. | Ethomid 0/15, 10 ml. | Conoco LS-320, 10g. | 1.5 g. |
| 13 | Propylene glycol, 7 ml. | Sellogen Conc., 10 ml. | Conoco LS-320, 2g. | 1.6 g. |
| 14 | Propylene glycol, | Pluronic L-44, | Conoco LS-320, | |

| | | 7 ml. | 10 ml. | 2 g. | 1.6 g. |
|---|---|---|---|---|---|
| 15 | Propylene glycol, 7 ml. | Pluronic L-64, 10 ml. | Conoco LS-320, 2 g. | | 1.6 g. |
| 16 | Propylene glycol, 7 ml. | Trepolate T-60, 10 ml. | Conoco LS-320, 2 g. | | 1.6 g. |
| 17 | Propylene glycol, 7 g. | Trepenol WAT, 10 g. | Conoco LS-320, 2 g. | | 1.0 g. |
| 18 | Propylene glycol, 7 ml. | Renex 36, 10 ml. | Conoco LS-320, 2 g. | | 1.6 g. |
| 19 | Renex 36, 17 ml. | (no other liquid used. | Conoco LS-320, 2 g. | | 1.0 g. |
| 20 | Hyamine 3500, 80% conc., 17 g. | (no other liquid used) | Conoco LS-320, 2 g. | | 1.0 g. |

By way of explanation, the following is noted with respect to ingredients mentioned in the above table: Polypropylene glycol used has an average molecular weight of 1200 and of a range from 1000 to 1400. Conoco sulfonic acid 400, Conoco sulfonic acid LS-320, and Nacconol SZA are typical alkylbenzene sulfonic acid products of the general type known as ABS acids. They are commercial grades of dodecylbenzene sulfonic acids. (Conoco acids are made by the Petrochemical Division of Continental Oil Co. Nacconol SZA is made by the National Aniline Division of Allied Chemical Corporation). Sulfamic acid is amido-sulfonic acid, the formula of which is $H_2N \cdot SO \cdot OH$.

Among the surfactants in the above table, and in examples given below, there are non-ionic, cationic, and anionic surfactants. Dowfax 9N9 is said to be nonylphenol condensed with nine molecules of ethylene oxide (made by Dow Chemical Company). Tween 80 is polyoxyethylene (20) sorbitan monooleate. Tween 20 is polyoxyethylene (20) sorbitan monolaurate. Brij 30 is polyoxyethylene (4) lauryl ether, one of a number of polyoxyethylene fatty alcohol ethers. Renex 36 is a polyoxyethylene (6) tridecyl ether. Myrj 52 is polyoxyethylene (40) stearate. (Tween, Brij, Myrj, and Renex are made by the Atlas Powder Company.) The Pluronics L-44 and L-64 are essentially ethylene oxide condensation products of polyoxypropylene glycols. (The Pluronics are made by Wyandotte Chemicals Corporation.) Ethofat 242/25 comprises polyoxyethylene glycol esters of fatty acids, and is said to be a 70% rosin fatty acid ethoxylated with 15 mols of ethylene oxide. Ethomeen S/12 is ethoxylated (2 mols) soybean amine. Ethomid 0/15 is ethoxylated (5 mols) oleyl amide. (Ethofat, Ethomid, and Ethomeen are made by Armour Industrial Chemical Company.) Sellogen Conc. is a taurine derivative and is said to be sodium oleylmethyltaurate (made by Jacques Wolf & Co., a division of Nopco Chemical Company). Trepolate T-60 is a 60% aqueous solution of the triethanolamine salt of an ABS acid, such as dodecylbenzene sulfonic acid. Trepolate YLA is monoisopropylamine salt of dodecylbenzene sulfonic acid. Trepenol WAT is the triethanolamine salt of lauryl sulfate (the last three are made by Treplow Products, Inc.). Span 80 is sorbitan monooleate and is made by Atlas Powder Company. Nonisol 250 is the ester of lauric acid and polyglycol 1000 and is made by Geigy Industrial Chemicals. Hyamine 3500 comprises 80% N-alkyl ($C_{12}$ to $C_{16}$) dimethyl benzyl ammonium chloride and 20% ethanol (made by Rohm & Haas Company).

After long standing, as indicated above, the products of Examples 1 to 20 in Table I were examined from the standpoint of characteristics such as, color, thickness of gel, fluidity, presence or absence of syneresis liquid, presence or absence of bubbles, and clarity or opacity, as noted in Table II below.

TABLE II.

| Example No. | Properties of Product |
|---|---|
| 1 | Light yellow; medium thick gel; tends to flow readily; no bubbles; glass-clear |
| 2 | Lighter than 1; medium thick gel; tends to flow readily; no bubbles; glass-clear |
| 3 | Very light yellow; medium thick gel; tends to flow readily; no bubbles; glass-clear |
| 4 | Water-white; medium thick gel; tends to flow readily; no bubbles; glass-clear |
| 5 | Water-white; medium thick gel; tends to flow readily; no bubbles; glass-clear |
| 6 | Very light tan; medium thick gel; tends to flow readily; no bubbles; glass-clear |
| 7 | Light tan; very thick gel; slight amount syneresis liquid; barely flows; no bubbles; glass-clear |
| 8 | Very light tan; very thick gel; no syneresis liquid; barely flows; no bubbles; glass-clear |
| 9 | Dark brown; very thick gel; slight amount of syneresis liquid; no flow; no bubbles; glass-clear |
| 10 | Dark brown; very thick gel; almost no odor; barely flows; few large bubbles; glass-clear |
| 11 | Faint yellow; very thick gel; slight amount syneresis liquid; no flow; no bubbles; glass-clear |
| 12 | Dark tan; solid gel; no syneresis; no flow; large bubbles; glass-clear |
| 13 | Water-white; solid gel; no syneresis; no flow; abundance of bubbles; glass-clear |
| 14 | Very light cream; medium thick gel; fairly fluent; no bubbles; glass-clear |
| 15 | Very light cream; medium thick gel; flows slowly; no bubbles; glass-clear |
| 16 | Light tan; medium thin gel; fairly fluent; no bubbles; glass-clear |
| 17 | Light tan; thin gel; flows readily; no bubbles; glass-clear |
| 18 | Almost water white; medium gel; flows readily; no bubbles; glass-clear |
| 19 | Almost water white; very thick gel; practically no flow; no bubbles; not glass-clear |
| 20 | Light tan; good thick gel; flows slowly; some bubbles; not glass-clear. |

The following examples of formulations in Table III illustrate the use of such mineral acids as hydrochloric, sulfuric, and phosphoric, and carboxylic acids such as formic and acetic, in the acid gel denture cleanser:

TABLE III.

| Ex. No. | Solvent | Surfactant | Acid | Cab-O-Sil |
|---|---|---|---|---|
| 21 | Propylene glycol, 7 ml. | Triton X-45, 10 ml. | Conc. hydrochloric (36%) 3 ml. | 1.6 g. |
| 22 | Propylene glycol, 7 ml. | Triton X-45, 10 ml. | Conc. sulfuric (98%) 1 ml. | 1.6 g. |
| 23 | Propylene glycol, 7 ml. | Triton X-45, 10 ml. | Conc. phosphoric (85%) 2 ml. | 1.6 g. |
| 24 | Propylene glycol, 7 ml. | Triton X-45, 10 ml. | Conc. formic (90.8%) 2 ml. | 1.6 g. |
| 25 | Propylene glycol, 7 ml. | Triton X-45, 10 ml. | Glacial acetic (99.7%) 2 ml. | 1.6 g. |
| 26 | Propylene glycol, 7 ml. | Dowfax 9N9, 10 ml. | Hydrochloric (36%) 3 ml. | 1.6 g. |
| 27 | Propylene glycol, 7 ml. | Dowfax 9N9, 10 ml. | Sulfuric (36%) 2 ml. | 1.6 g. |
| 28 | Propylene glycol 7 ml. | Dowfax 9N9, 10 ml. | Phosphoric (36%) 3 ml. | 1.6 g. |
| 29 | Propylene glycol, 7 ml. | Dowfax 9N9, 10 ml. | Formic (36%) 3 ml. | 1.6 g. |
| 30 | Propylene glycol, 7 ml. | Dowfax 9N9, 10 ml. | Acetic (36%) 3 ml. | 1.6 g. |
| 31 | Denatured ethyl alcohol 7 ml. | Dowfax 9N9, 10 ml. | Hydrochloric (36%) 3 ml. | 1.6 g. |
| 32 | Isopropanol, 15.6 ml., water, 8.0 ml. | Dowfax 9N9, 40 ml. | Hydrochloric (36%) 9.3 ml. | 7.7 g. |

Triton X–45 in Table III is isooctylphenyl polyethoxyethanol (made by Rohm & Haas Co.). The composition of Dowfax has previously been noted.

In each of the examples 21 to 30 inclusive, in Table III above, the solvent and surfactant are mixed together, the acid is then added, and finally the Cab-O-Sil is introduced, whereupon the products are degassed as much as possible by applying a vacuum. In examples 31 and 32, the Cab-O-Sil is added to the mixture of solvent and a surfactant, while slowly stirring, and a vacuum is applied to remove air introduced with the Cab-O-Sil. This can be accomplished very readily at this stage by applying vacuum for only a very short period of time. Most of the bubbles break spontaneously. The acid is then added to and gently folded in the product from which bubbles have been removed. Bubble-free acid gel products are thus obtained.

Characteristics of the products of formulations in Table III are noted in Table IV below.

TABLE IV.

| Example No. | Characteristics of Product |
|---|---|
| 21 | Glass-clear; very faint yellow; medium-thick gel; no bubbles; flows readily |
| 22 | Glass-clear; light yellow; medium-thick gel; no bubbles; flows readily |
| 23 | Glass-clear; light yellow; medium thick gel; no bubbles; flows readily |
| 24 | Glass-clear; light yellow; separation into gels of different thickness; no bubbles; portion of gel non-flowing other portion flows readily |
| 25 | Not discernibly different from 24 |
| 26 | Glass-clear; water-white; thicker than medium; no bubbles; flows readily |
| 27 | Glass-clear; water-white; medium-thick gel; no bubbles; flows readily |
| 28 | Glass-clear; water-white; thicker than medium; no bubbles; flows readily |
| 29 | Like 24 |
| 30 | Like 25 but thinner |
| 31 | Clear; faintly yellow; medium-thin gel containing a few bubbles; flows readily |
| 32 | Glass-clear; faintly yellow; rather thick gel; no bubbles; almost no flow. |

The following examples illustrate additional formulations, certain of which are preferred. Preferred methods of preparing clear gel cleansers with a desirable gel structure are also indicated. In has been found that in the use of ABS acids, inclusion of auxiliary surfactants provides improved, favorable results. The effects are also noted by adding triethanolamine, particularly in certain preferred stages, whereby the triethanolamine salt of the sulfonic acid, such as dodecylbenzene sulphonic acid, is formed in situ. A preferred range of the free acid in the product is noted as substantially 5 to substantially 10 percent.

The proportions of ingredients in these examples are given in parts by weight except where otherwise noted. The alkyl benzene sulfonic acid in the formulations is listed as LS–320; the triethanolamine is listed as TEA; the propylene glycol as PG; and the Cab-O-Sil as C-O-S.

Example 33.

| LS–320 | 36.0 |
|---|---|
| PG | 24.0 |
| C-O-S | 3.2 |
| Water | 8.0 |

LS–320, PG and water are mixed and heated to below boiling. Then C-O-S is mixed into the heated liquid; and the mix is subjected to vacuum. The product is clear, dark tan, thick and more of the nature of a salve than a gel.

Example 34.

| LS–320 | 8.9 |
|---|---|
| PG | 4.0 |
| TEA | 3.3 |
| C-O-S | 1.6 |
| Tween 80 | 2.0 |
| Water | 2.0 |

LS–320, PG and water are mixed and heated to below boiling to expel sulphur dioxide and to vaporize petroleum hydrocarbons. C-O-S is stirred into the hot mix and the stirring is continued to force out air bubbles. TEA is added and stirred in, whereupon the mix thickens. Tween 80 is then introduced as an auxiliary surfactant. After prolonged standing, this formulation yields a light tan, glass-clear, thick gel having no perceptible flow characteristics. The product has some salve-like properties and is therefore lacking in desired gel structure.

Example 35.

| LS–320 | 36.4 |
|---|---|
| PG | 20.0 |
| C-O-S | 6.4 |
| TEA | 13.2 |
| Water | 2.0 |
| Tween 80 | 2.0 |

These ingredients are mixed in the order listed and an additional 12 parts of water are added to improve gel structure and avoid formation of a salve. Isopropanol is added to assist in removing bubbles while applying vacuum. Some of the isopropanol is evaporated off. A highly desirable light tan, crystal-clear, stiff gel is provided with no-flow characteristics. After prolonged standing, some syneresis is noted though it is insignificant.

Example 36.

| LS–320 | 36.4 |
|---|---|
| PG | 20.0 |
| C-O-S | 6.4 |
| TEA | 13.2 |
| Water | 14.0 |
| Tween 80 | 2.0 |
| Isopropanol | 15.0 |

PG and isopropanol are mixed and water is added, whereafter C-O-S is stirred into the solution. The mix is at first pasty and then becomes very fluid and translucent, on continued stirring. This mix is placed under vacuum and is thinned by adding LS–320, after which a vacuum is again applied and isopropanol boils off. Tween 80 and TEA are added in succession with gentle stirring. The mass thickens and eventually forms an excellent clear, light tan gel that resists flow, has no bubbles or lumps and forms very little syneresis liquid. In tests made by denture wearers, no after-taste was noted.

Example 37.

| Trepolate YLA | 40 ml. |
|---|---|
| PG | 20 ml. |
| LS–320 | 4 grams |
| C-O-S | 6 grams |

Components in the above formulation are mixed in the order listed. A thick, transparent, very light-yellow gel is formed. The air in this gel is very difficult to remove, even on evacuation. About 6.4 parts by weight of isopropanol are added to the thick gel, and vacuum is applied. Gas bubbles burst, but deaeration is not fast enough. Another 2.6 parts by weight of isopropanol are added, whereupon bubbles in the system coalesce even while stirring. Air is easily removed by applying a vacuum, producing a clear product. A part of the isopropanol is removed, if desired, by additional vacuum treatment or otherwise. The final product is a transparent, crystal-clear, very light-colored gel with no bubbles, after a prolonged period of standing.

Clear gel of the above product of Example 37 when mixed with an equal volume of a clear hydrochloric acid gel produced substantially in accordance with Example 32, is found to form a clear gel. The two products mix easily and no precipitate forms.

Example 38.

| LS–320 | 17.8 |
|---|---|
| PG | 12.0 |
| C-O-S | 3.2 |

| | |
|---|---|
| TEA | 6.6 |
| Water | 4.0 |
| Tween 80 | 4.0 |

The ingredients in this formulation are mixed in the order listed. In bringing the ingredients together, C-O-S is thoroughly incorporated before the TEA is added. After the system has formed a soft gel, the water is added, and finally the Tween 80. The product is deaerated and is then found to be a light-brown, amber, glass-clear, soft gel.

A clear gel made by this procedure is mixed with an equal volume of a clear gel that is made with the following ingredients in parts by weight:

| | |
|---|---|
| Concentrated hydrochloric acid | 9.3 |
| Dowfax 9N9 | 40.0 |
| PG | 14.3 |
| Water | 9.3 |
| C-O-S | 8.0 |

At first, the two gel components mix well and yield a clear product. Then suddenly, crystallization occurs (perhaps triethanolamine hydrochloride forms) and a beautiful light-tan but non-transparent gel is formed which is much thicker than either component gel.

Example 39.

| | |
|---|---|
| PG | 20.0 |
| Isopropanol | 15.0 |
| Water | 14.0 |
| C-O-S | 6.4 |
| LS-320 | 36.4 |
| 30% H$_2$O$_2$ | 0.66 |
| Tween 80 | 2.0 |
| TEA | 13.2 |

PG, isopropanol and water are mixed together, and C-O-S is stirred in while heating moderately. Vacuum is applied to remove air, during which about 4 parts by weight of water and isopropanol evaporate. LS-320 is introduced whereupon 0.3 part by weight of volatiles is lost. Thereafter the H$_2$O$_2$ is added and mixed in. This is followed by addition of Tween 80 and finally TEA, each being successively stirred in.

The peroxide serves to bleach the brown color imparted by the LS-320, and it does this without noticeably affecting the viscosity of the gel, and without formation of bubbles.

The product has about 7.5% free acid as dodecylbenzene sulfonic acid.

Coloring, such as Methyl Red, is added. The red-colored gel is of excellent structure and is crystal-clear.

The same results are obtained with this formulation in large or small bulk preparation.

Example 40.

| | |
|---|---|
| PG | 20.0 |
| Isopropanol | 15.0 |
| Water | 13.0 |
| C-O-S | 6.4 |
| LS-320 | 33.6 |
| 30% H$_2$O$_2$ | 1.1 |
| Tween 80 | 2.0 |
| TEA | 13.2 |

The ingredients are mixed together in the order given in the above list. After prolonged standing the product is a water-white, thick gel with no bubbles. It is faintly hazy, and very little syneresis liquid is present.

Example 41.

| | |
|---|---|
| PG | 20.0 |
| Isopropanol | 15.0 |
| Water | 13.0 |
| Span 80 | 1.0 |
| C-O-S | 6.4 |
| LS-320 | 36.4 |
| 30% H$_2$O$_2$ | 1.1 |
| Tween 20 | 2.0 |

The first four items are mixed thoroughly while forming an emulsion. This is poured over the C-O-S which is weighed in a separate container. The emulsion is stirred with the C-O-S until smooth. Then the ABS acid and later the H$_2$O$_2$ are added. A very thin liquid forms, from which the air bubbles escape readily without the need of applying a vacuum. This liquid is very smooth and contains no lumps, but there are some indications that there is what may be called an incipient gel structure. The product is allowed to stand overnight, that is, for about 12 hours, and forms a very thin gel. There is now added directly on top, the two parts by weight of Tween 20 of the above formulation with gentle mixing and further stirring. The resulting mix becomes very stiff so that it barely flows on tilting the container. It is glass-clear, light tan in color, and very brilliant.

This example serves in establishing the fact that a good gel can be made without vacuum removal of the air introduced by addition of the C-O-S if a relatively hydrophobic, nonionic surfactant, like the above Span 80 with a relatively low HLB number in the range of about 3 to 6, is used in the initial wetting of the C-O-S, and a very hydrophilic surfactant, such as the above Tween 20 with a relatively high HLB number above about 12, is added to the mix after the air bubbles derived from the C-O-S have had a chance to escape continuously from the initial low-viscosity system.

Example 42.

| | |
|---|---|
| PG | 600 |
| Isopropanol | 450 |
| Water | 390 |
| Span 80 | 30 |
| C-O-S | 192 |
| LS-320 | 1092 |
| 30% H$_2$O$_2$ | 33 |
| TEA | 396 |
| Tween 20 | 30 |

Tween 20 is said to be polyoxyethylene sorbitan monolaurate.

The first four ingredients are mixed together, producing an emulsion or suspension. C-O-S is added with stirring, producing an intermediate thick, translucent gel. Thereafter LS-320 is added very slowly in a thin stream, with gentle stirring. The gel thins out to a clear jelly. H$_2$O$_2$ is stirred into the jelly, then TEA is added, and finally Tween 20 with gentle stirring. After prolonged standing the product matures into a beautiful medium-thick gel which is glass-clear, light yellow in color, contains no bubbles, is resistant to flow. There is no graininess and no syneresis.

Example 43.

| | |
|---|---|
| PG | 20.0 |
| Isopropanol | 15.0 |
| Water | 13.0 |
| LS-320 | 2.0 |
| C-O-S | 6.4 |
| LS-320 | 34.4 |
| 30% H$_2$O$_2$ | 1.1 |
| TEA | 13.2 |
| Tween 20 | 2.0 |

The first four ingredients in this list are measured out and mixed together. It is found that by including a small portion of the total amount of LS-320 before mixing in the C-O-S in the solvent mix, there is less possibility of forming an initial stiff gel with the C-O-S at this stage. The said first four ingredients in the proportion listed are poured over the C-O-S and the mixture is gently stirred, forming a translucent, thin, very light tan jelly, from which air escapes spontaneously without difficulty. Then the second, larger portion of LS-320 is added slowly, in a thin stream, with stirring. No lumps are formed at this stage. The peroxide is next introduced and bleaches the mix to a lighter color. The TEA is stirred in slowly, and then Tween 20 is finally added with stirring. The gel, in its desired form, is produced substantially immediately in this procedure. It remains smooth and thick after long standing for six months or more, and resists flow, is crystal-clear, light yellow in color. There are no bubbles. There is no graininess or syneresis.

As illustrated in Example 43, in a preferred method of preparing the acid gel, a quicker removal of bubbles is effected, and a quicker or instantaneous formation of an acid gel with a desired combination of preferred characteristics takes place. This example, as well as others, also illustrates the adjustment of the consistency of a gel after addition of the TEA by addition of a hydrophilic, nonionic surfactant with a high HLB number above 12. Though thickening is effected and though peroxide is introduced to decolorize the brown, commercial alkyl benzene sulfonic acid to a light-yellow color, a crystal-clear gel is obtained as the final product.

The following examples serve to illustrate the preparation of the acid gel product with different organic solvents varying widely, in some instances, from each other as to the solubility thereof in water. The abbreviated designations of certain ingredients are included in these formulations as in Examples 33 to 43. Table V hereinbelow, after Example 62, summarizes characteristics of the products of Examples 44 to 62 after a period of standing.

Example 44.

| | |
|---|---|
| Glycerine (96%) | 20.8 grams |
| Isopropanol | 15.0 grams |
| Water | 13.0 grams |
| LS-320 | 2.0 grams |
| C-O-S | 6.4 grams |
| LS-320 | 36.9 grams |
| $H_2O_2$ (30%) | 1.0 ml. |
| TEA | 13.2 grams |
| Tween 80 | 2.0 grams |

A clear light brown solution is formed with the first four ingredients. The C-O-S is added to the solution which forms a jelly that is deaerated fairly readily. Applied vacuum assists in further deaeration. The remaining main portion of the LS-320 is stirred in very slowly. The last three ingredients are added and stirred in, in sequence. A thick, light-brown, glass-clear gel forms which contains some bubbles.

Example 45.

| | |
|---|---|
| Propylene glycol | 20 ml. |
| Secondary butyl alcohol (99.7% pure) | 19 ml. |
| Water | 13 ml. |
| LS-320 | 2 ml. |
| C-O-S | 6.4 grams |
| LS-320 | 34.4 grams |
| 30% $H_2O_2$ | 1 ml. |
| TEA | 13.2 grams |
| Tween 20 | 2 grams |

The first four ingredients are mixed. A clear solution forms. The solution is poured over the C-O-S and the latter is thoroughly incorporated. The last four ingredients are included as set forth in Example 44. The hydrogen peroxide caused a faster and greater decolorization than in Example 44. The product is an excellent, thick, light-brown gel. It rinses off easily with water.

Example 46.

| | |
|---|---|
| PG | 21 ml. |
| Hexyl alcohol (98.9% pure) | 20 ml. |
| Water | 13 ml. |
| LS-320 | 2 ml. |
| C-O-S | 6.4 grams |
| LS-320 | 34.4 grams |
| 30% $H_2O_2$ | 1.0 ml. |
| TEA | 13.2 grams |
| Tween 20 | 2.0 grams |

The above ingredients are brought together in a manner set forth in Example 45. The product when made is an attractive, light-brown gel with some bubbles.

Example 47.

| | |
|---|---|
| PG | 20 ml. |
| Ethanol (pure grain, 190 proof) | 19 ml. |
| Water | 12 ml. (instead of 13, |
| LS-320 | 2 ml. to compensate |
| C-O-S | 6.4 grams for water in |
| LS-320 | 34.4 grams the alcohol) |
| 30% $H_2O_2$ | 1.0 ml. |
| TEA | 13.2 grams |
| Tween 20 | 2.0 grams |

The above ingredients are brought together in a manner set forth in Example 45. It is noted that 12 ml. of water instead of 13 ml. are used to compensate for the water in the alcohol.

Example 48.

| | |
|---|---|
| PG | 20 ml. |
| Decyl alcohol (99.5% pure) | 19 ml. |
| Water | 13 ml. |
| LS-320 | 2 ml. |
| C-O-S | 6.4 grams |
| LS-320 | 34.4 grams |
| 30% $H_2O_2$ | 1.0 ml. |
| TEA | 13.2 grams |
| Tween 20 | 2.0 grams |

The method of preparation is similar to that in Example 45.

Example 49.

| | |
|---|---|
| PG | 21 ml. |
| Lorol 11 (80% Dedecanol) | 19 ml. |
| Water | 13 ml. |
| LS-320 | 2 ml. |
| C-O-S | 6.4 grams |
| LS-320 | 34.4 grams |
| 30% $H_2O_2$ | 1.0 ml. |
| TEA | 13.2 grams |
| Tween 20 | 2.0 grams |

The method of preparation is similar to that in Example 45.

Example 50.

| | |
|---|---|
| PG | 20 ml. |
| Tridecyl alcohol (99.6% pure) | 19 ml. |
| Water | 13 ml. |
| LS-320 | 2 ml. |
| C-O-S | 6.4 grams |
| LS-320 | 34.4 grams |
| 30% $H_2O_2$ | 1.0 ml. |
| TEA | 13.2 grams |
| Tween 20 | 2.0 grams |

The method of preparation is similar to that in Example 45. In Examples 48, 49 and 50, on bringing the first four items together, an emulsion was formed in each case, as distinct from a transparent solution. In each case also, on mixing together the first five items of these formulations, a jelly is not formed as in examples in which lower alcohols are used but rather a stiff, white, gelatinous paste which on addition of a very small portion of item 6 of said latter formulations, becomes a glass-clear, stiff gel having a considerable bubble content. The formation of a gel as stiff as this at this stage is avoided by increasing the proportion of item 4 (initial portion of LS–320). On addition of the last three items in sequence the intermediate stiff gel is thinned somewhat and becomes more transparent though a fair number of bubbles is present.

Example 51.

| | |
|---|---|
| PG | 20 ml. |
| 2-octyldodecanol ("Eutanol G") | 19 ml. |
| Water | 13 ml. |
| LS-320 | 2 ml. |
| C-O-S | 6.4 grams |
| LS-320 | 34.4 grams |
| 30% $H_2O_2$ | 1.0 ml. |
| TEA | 13.2 grams |
| Tween 20 | 2.0 grams |

The ingredients in this formulation are brought together in sequence as in Example 50. The formation of a very stiff gel by mixing the first five items can be avoided by increasing the proportion of the first addition of LS-320. Kneading of the mix of the first five items with item 6 converts a too thick intermediate gel into a transparent, thinner gel. Further adjustment of consistency and appearance has been accomplished with the last two items.

Example 52.

| | |
|---|---|
| PG | 20 ml. |
| Normal butyl alcohol | |

| | |
|---|---|
| (99.0% pure) | 19 ml. |
| Water | 13 ml. |
| LS-320 | 2 ml. |
| C-O-S | 6.4 grams |
| LS-320 | 35.6 grams |
| 30% H₂O₂ | 1.0 ml. |
| TEA | 13.2 grams |
| Tween 20 | 2.0 grams |

The method of preparation is similar to that in Example 45.

Example 53.

| | |
|---|---|
| PG | 20.5 ml. |
| Isobutyl alcohol (99.3% pure) | 19.5 ml. |
| Water | 13 ml. |
| LS-320 | 2 ml. |
| C-O-S | 6.4 grams |
| LS-320 | 34.4 grams |
| 30% H₂O₂ | 1.0 ml. |
| TEA | 13.2 grams |
| Tween 20 | 2.0 grams |

The method of preparation is similar to that employed in Example 45.

Example 54.

| | |
|---|---|
| PG | 20 ml. |
| Primary amyl alcohol (mixed isomers) | 19 ml. |
| Water | 13 ml. |
| LS-320 | 2 ml. |
| C-O-S | 6.4 grams |
| LS-320 | 34.4 grams |
| 30% H₂O₂ | 1.0 ml. |
| TEA | 13.2 grams |
| Tween 20 | 2.0 grams |

The method of preparation is similar to that in Example 45.

Example 55.

| | |
|---|---|
| PG | 20 ml. |
| Tertiary butyl alcohol (99.5% pure) | 19 ml. |
| Water | 13 ml. |
| LS-320 | 2 ml. |
| C-O-S | 6.4 grams |
| LS-320 | 34.4 grams |
| 30% H₂O₂ | 1.0 ml. |
| TEA | 13.2 grams |
| Tween 20 | 2.0 grams |

The method of preparation is substantially similar to that in Example 45. Since t-butyl alcohol is a solid at room temperatures (m.pt.25.6° C.), it is warmed to melt it, whereupon it is included in the solvent component. No recrystallization of the alcohol takes place.

Example 56.

| | |
|---|---|
| PG | 20 ml. |
| Methyl isobutyl carbinol (98.0% pure) | 19 ml. |
| Water | 13 ml. |
| LS-320 | 2 ml. |
| C-O-S | 6.4 grams |
| LS-320 | 34.4 grams |
| 30% H₂O₂ | 1.0 ml. |
| TEA | 13.2 grams |
| Tween 20 | 2.0 grams |

The method of preparation is similar to that in Example 45.

Example 57.

| | |
|---|---|
| PG | 20 ml. |
| 2-ethylhexyl alcohol (99.9% pure) | 19 ml. |
| Water | 13 ml. |
| LS-320 | 2 ml. |
| C-O-S | 6.4 grams |
| LS-320 | 34.9 grams |
| 30% H₂O₂ | 1.0 ml. |
| TEA | 13.2 grams |
| Tween 20 | 2.0 grams |

The method of preparation is similar to that in Example 45.

Example 58.

| | |
|---|---|
| PG | 20 ml. |
| Isooctyl alcohol (99.6% pure) | 19 ml. |
| Water | 13 ml. |
| LS-320 | 2 ml. |
| C-O-S | 6.4 grams |
| LS-320 | 34.4 grams |
| 30% H₂O₂ | 1.0 ml. |
| TEA | 13.6 grams |
| Tween 20 | 2.0 grams |

The method of preparation is similar to that in Example 45.

Example 59.

| | |
|---|---|
| Dipropylene glycol methyl ether (Dowanol DPM of Dow Chemical Company) | 38 ml. |
| Water | 12 ml. |
| LS-320 | 2 ml. |
| C-O-S | 6.4 grams |
| LS-320 | 34.0 grams |
| 30% H₂O₂ | 1.0 ml. |
| TEA | 13.0 grams |
| Tween 20 | 1.3 grams |

The method of preparation is similar to that in Example 45.

Example 60.

| | |
|---|---|
| PG | 20 ml. |
| Diethylene glycol ethyl ether (Dowanol DE of Dow Chemical Company) | 20 ml. |
| Water | 10 ml. |
| LS-320 | 2 ml. |
| C-O-S | 6.4 grams |
| LS-320 | 34.0 grams |
| 30% H₂O₂ | 1.0 ml. |
| TEA | 13.0 grams |
| Tween 20 | 2.0 grams |

The method of preparation is similar to that in Example 45. The intermediate mix of the first five items is a thin translucent jelly without bubbles.

Example 61.

| | |
|---|---|
| PG | 20 ml. |
| Propylene glycol methyl ether (Dowanol PM of Dow Chemical Company) | 10 ml. |
| Water | 10 ml. |
| LS-320 | 2 ml. |
| C-O-S | 6.4 grams |
| LS-320 | 34.0 grams |
| 30% H₂O₂ | 1.0 ml. |
| TEA | 13.0 grams |
| Tween 20 | 2.0 grams |

The method of preparation is similar to that in Example 45. The intermediate mix of the first five items is a fairly thin translucent jelly containing some bubbles.

Example 62.

| | |
|---|---|
| PG | 10 ml. |
| Triethylene glycol ethyl ether containing traces of some ethers of higher alcohols as impurities (Dowanol TEH of Dow Chemical Co.) | 20 ml. |
| Water | 10 ml. |
| LS-320 | 2 ml. |
| C-O-S | 6.4 grams |
| LS-320 | 34.0 grams |
| 30% H₂O₂ | 1.0 ml. |
| TEA | 10.0 grams |
| Tween 20 | 2.0 grams |

The method of preparation is similar to that in Example 45. The intermediate mix of the first five items is a fairly thin translucent jelly containing some bubbles.

The following table indicates physical characteristics of the products of Examples 44 to 62, after a period of standing:

TABLE V.

| Example No. | Characteristics of Product |
|---|---|

| | |
|---|---|
| 44 | Light tan; transparent; some bubbles; very thick gel; non-free-flowing; brilliant |
| 45 | Light yellow; crystal-clear; few bubbles; very thick gel; non-free-flowing; brilliant |
| 46 | Light yellow; crystal-clear; some bubbles; very thick gel; barely free-flowing; brilliant |
| 47 | Light yellow; faint haze; very few bubbles; very thick gel; barely free-flowing; not brilliant |
| 48 | Light yellow; translucent; some bubbles; very thick gel; non-free-flowing; not brilliant |
| 49 | Light yellow; clearer than 48; numerous bubbles; very thick gel; non-free-flowing; not brilliant |
| 50 | Light yellow; clearer than 48; some bubbles; very thick gel; non-free-flowing; not brilliant |
| 51 | Light tan; translucent; few bubbles; very thick gel; non-free-flowing; not brilliant |
| 52 | Light tan; glass-clear; few bubbles; very thick gel; barely free-flowing; very brilliant |
| 53 | Light tan; glass-clear; some bubbles; very thick gel; barely free-flowing; very brilliant |
| 54 | Light tan; glass-clear; some bubbles; very thick gel; barely free-flowing; very brilliant |
| 55 | Light tan; glass-clear; some bubbles; very thick gel; barely free-flowing; very brilliant |
| 56 | Light yellow; glass-clear; some bubbles; very thick gel; barely free-flowing; very brilliant |
| 57 | Light yellow; glass-clear; some bubbles; thick gel; slightly free-flowing; very brilliant |
| 58 | Light yellow; faint haze; some bubbles; thick gel; slightly free-flowing; not brilliant |
| 59 | Light tan; glass-clear; substantially no bubbles; thick gel; slightly free-flowing; very brilliant |
| 60 | Light tan; glass-clear; substantially no bubbles; medium thick gel; slightly free-flowing; very brilliant |
| 61 | Light tan; glass-clear; very few bubbles; medium thick gel; slightly free-flowing; very brilliant |
| 62 | Light yellow; glass-clear; very few bubbles; medium thick gel; slightly free-flowing; not brilliant |

Most of the alcohols in Examples 44 to 62 have a very low solubility in water, and, conversely, water solubility in those alcohols is low, and yet the acid gel product is transparent in most instances. These products have no disagreeable odor and some of them are odorless. These products are also quickly and completely washed from surfaces. By holding a treated denture in a water-stream from a spigot, the cleanser is removed in seconds, leaving the denture thoroughly cleansed without an after-taste.

A further example is noted below to illustrate the preparation of a crystal-clear gel containing hydrochloric acid. It also illustrates the effect of including a small amount of sulfonic acid with the solvent component and hydrochloric acid before mixing these with the C-O-S, thus preventing crumbling or undue thickening at this stage.

Example 63.

| | |
|---|---|
| PG | 20 ml. |
| HCl (36%) | 15 ml. |
| Isopropanol | 10 ml. |
| LS-320 | 2 ml. |
| C-O-S | 7 grams |
| Trepolate YLA | 50 grams |
| Tween 20 | 2 grams |

The first four items form an opalescent solution which is poured over the C-O-S and thoroughly incorporated by mechanical mixing and kneading until a thick, smooth gel is obtained. No vacuum is applied at this stage. The gel is added to the Trepolate YLA and a thin gel is formed. On adding the y between 20 the gel is thickened to a non-flowing consistency and yet the thickened gel is glass-clear. The product is light-yellow, brilliant, and some bubbles are present.

The following example illustrates the use of a mixture of alcohols in which an additional alcohol makes possible an easier removal of bubbles from a mix.

Example 64.

| | |
|---|---|
| PG | 20 ml. |
| Isopropanol | 17 ml. |
| 2-ethylhexanol | 4 ml. |
| Water | 10 ml. |
| LS-320 | 1 ml. |
| C-O-S | 6.4 grams |
| LS-320 | 41.8 grams |
| $H_2O_2$ (30%) | 2.0 ml. |
| TEA | 13.2 grams |
| Tween 20 | 2.0 grams |

The first five items form an opalescent solution which is poured over the C-O-S and thoroughly incorporated therewith. It is noteworthy that a clear, thick gel is formed at this stage and bubbles are easily removed due to the presence of 2-ethylhexanol. After the addition of the succeeding ingredients in sequence, the gel contains substantially no bubbles. After a period of standing, the product is a thick, crystal-clear gel with no bubbles or unpleasant odor, and is substantially non-flowing, and is easily washed from a surface.

Further variations or changes in formulations are illustrated in the following additional examples of preparing products with certain preferred characteristics:

Example 65.

| | |
|---|---|
| Glycerine 96% | 10 ml. |
| Propylene glycol | 10 ml. |
| Isopropanol | 15 ml. |
| Water | 10 ml. |
| ABS acid LS-320 | 2 ml. |
| Cab-O-Sil | 6.4 grams |
| LS-320 | 34.4 grams |
| Hydrogen peroxide 30% | 1.0 ml. |
| TEA | 13.2 grams |
| Tween 20 | 2.0 grams |

The first five items form a solution which is poured over the C-O-S and is thoroughly incorporated, producing a medium thin jelly. After introducing the remaining ingredients and after a period of standing, the final product is a light-yellow, crystal-clear, brilliant, thick gel which is almost fully flow-resistant and contains some bubbles.

Example 66.

| | |
|---|---|
| Propylene glycol | 20 ml. |
| 96% ethanol USP | 18 ml. |
| Water | 12 ml. |
| LS-320 | 2 ml. |
| C-O-S | 6.5 grams |
| LS-320 | 31.5 grams |
| Hydrogen peroxide 30% | 1.0 ml. |
| Tween 20 | 2.0 grams |

The first four ingredients are mixed, the C-O-S is incorporated therewith, and the last three ingredients are introduced and mixed in, in sequence. The final product after a period of standing is a light-yellow, slightly cloudy, thick gel, resistant to flow. A few syneresis drops are seen on the surface.

Example 67.

| | |
|---|---|
| Propylene glycol | 20 ml. |
| 96% ethanol USP | 15 ml. |
| Water | 10 ml. |
| LS-320 | 2 ml. |
| C-O-S | 5 grams |
| LS-320 | 21 grams |
| Hydrogen peroxide 30% | 1.0 ml. |
| TEA | 5.0 grams |
| Tween 20 | 1.0 grams |

The C-O-S is incorporated with the mix of the first-listed ingredients, and the remaining ingredients are added and mixed in, in sequence. After a period of standing, the product is a light-yellow, fairly cloudy thick gel, flow-resistant, containing no bubbles. Syneresis liquid is barely visible. A reduction in the proportion of ABS acid appears to result in increased cloudiness.

Example 68.

| | |
|---|---|
| Glycerine 96% | 10 ml. |
| PG | 10 ml. |
| 96% ethanol USP | 15 ml. |
| Water | 10 ml. |
| LS-320 | 2 ml. |
| C-O-S | 6.0 grams |
| LS-320 | 320 grams |
| Hydrogen peroxide 30% | 1 ml. |
| TEA | 5 grams |
| Tween 20 | 1.2 grams |

The procedure in the preparation of the product is as indicated in Example 67. The final product after standing, is a light-yellow, slightly cloudy, thick gel, resistant to flow, and containing no bubbles. Syneresis liquid is barely visible. Glycerine appears to compensate somewhat for the reduction in ABS acid.

Example 69.

| | |
|---|---|
| Glycerine 96% | 20 ml. |
| 96% ethanol USP | 18 ml. |
| Water | 12 ml. |
| LS-320 | 2 ml. |
| C-O-S | 6 grams |
| LS-320 | 30 grams |
| Hydrogen peroxide 30% | 2 ml. |
| Tween 20 | 1.2 grams |

The procedure is as indicated in Example 67. The final product after a period of standing is a light-yellow, very slightly cloudy, thick gel, flow-resistant, and containing no bubbles. Syneresis liquid on top of the gel is barely visible. Glycerine as well as ABS acid having a relatively high refractive index serve in producing clarity in the gel. In this respect, glycerine appears to be somewhat better than propylene glycol.

Example 70.

| | |
|---|---|
| Glycerine 96% | 15 ml. |
| Secondary butyl alcohol | 5 ml. |
| 96% ethanol USP | 18 ml. |
| Water | 12 ml. |
| LS-320 | 2 ml. |
| C-O-S | 6 grams |
| LS-320 | 30 grams |
| Hydrogen peroxide 30% | 2 ml. |
| Tween 20 | 1.2 grams |

The secondary butyl alcohol is substituted for part of the glycerine in Example 69. In other respects, the procedure is as indicated in Example 67. The clarity of the gel is reduced a little. The final product after a period of standing, is a light-yellow, slightly cloudy, thick gel, that is flow-resistant and contains no bubbles. A drop of syneresis liquid is visible on top of the gel.

Example 71.

| | |
|---|---|
| Glycerine 96% | 20 ml. |
| 96% ethanol USP | 18 ml. |
| Water | 12 ml. |
| LS-320 | 2 ml. |
| C-O-S | 6 grams |
| LS-320 | 34 grams |
| Hydrogen peroxide 30% | 2 ml. |
| n-hexylamine | 8 grams |
| Tween 20 | 1.2 grams |

The procedure is as indicated in Example 67. Several drops of isooctyl alcohol may be added after mixing the first four items with the C-O-S to remove foam bubbles. The final product after a period of standing is a light-yellow, crystal-clear, brilliant, very thick gel, flow-resistant and containing only few bubbles. Two or three drops of syneresis liquid are visible on top of the gel.

Example 72.

| | |
|---|---|
| Glycerine 96% | 40 ml. |
| 96% ethanol USP | 18 ml. |
| Water | 12 ml. |
| LS-320 | 2 ml. |
| C-O-S | 6 grams |
| LS-320 | 14 grams |
| Hydrogen peroxide 30% | 1 ml. |
| Tween 20 | 1.2 grams |

The procedure is as indicated in Example 67. The final product after a period of standing is a light-yellow, slightly cloudy, thick gel, flow-resistant and containing no bubbles. No syneresis is evident. Several drops of isooctyl alcohol may be added after mixing together the first five ingredients in order to remove foam bubbles.

Example 73.

| | |
|---|---|
| Glycerine 96% | 40 ml. |
| Ethanol (90%) - n-butanol (10%) | 18 ml. |
| Water | 12 ml. |
| LS-320 | 2 ml. |
| C-O-S | 6 grams |
| LS-320 | 14 grams |
| Hydrogen peroxide 30% | 1 ml. |
| Tween 20 | 2 grams |

The procedure is as indicated in Example 67. The final product is similar to that in Example 72.

Example 74.

| | |
|---|---|
| Glycerine 96% | 20 ml. |
| Ethanol (90%) - n-butanol (10%) | 18 ml. |
| Water | 12 ml. |
| LS-320 | 2 ml. |
| C-O-S | 6 grams |
| LS-320 | 30 grams |
| Hydrogen peroxide 30% | 2 ml. |
| Tween 20 | 1.2 grams |

The procedure is as indicated in Example 67. The final product after a period of standing is a light-yellow, crystal-clear, brilliant, very thick gel, flow-resistant, with a fair amount of bubbles but no synersis. The n-butanol in the denatured alcohol appears to aid in obtaining a clear gel.

Example 75.

| | |
|---|---|
| Glycerine 96% | 40 ml. |
| Ethanol (90%) - n-butanol (10%) | 18 ml. |
| Water | 12 ml. |
| LS-320 | 2 ml. |
| C-O-S | 6 grams |
| LS-320 | 14 grams |
| Hydrogen peroxide 30% | 1 ml. |
| between 20 | 1.2 grams |

The procedure is as indicated in Example 67. The final product after a period of standing is a light-yellow, slightly cloudy, thick gel, flow-resistant, with some bubbles, and no signs of syneresis.

Example 76.

| | |
|---|---|
| Glycerine 96% | 20 ml. |
| Dowfax 9N9 | 20 ml. |
| 96% ethanol USP | 18 ml. |
| Water | 12 ml. |
| LS-320 | 2 ml. |
| C-O-S | 6 grams |
| LS-320 | 14 grams |
| Hydrogen peroxide 30% | 1 ml. |
| Tween 20 | 1.2 grams |

The procedure in the preparation of the product is as indicated in Example 67. Initially, the product when made is clear but foamy and runny, and is not a gel. After a period of standing, the product is a light-yellow, cloudy, thick gel which barely flows and contains numerous bubbles which apparently causes the cloudi-ness. No syneresis is apparent.

Example 77.

| | |
|---|---|
| Glycerine 96% | 20 ml. |
| Ethanol (90%) - n-butanol (10%) | 15 ml. |
| Water | 10 ml. |
| LS-320 | 2 ml. |
| C-O-S | 6.4 grams |
| LS-320 | 34.4 grams |
| Hydrogen peroxide 30% | 1.0 ml. |
| TEA | 13.2 grams |
| Tween 20 | 2.0 grams |

The procedure is as indicated in Example 67. The final product after a period of standing, is a crystal-clear, brilliant, thick gel which barely flows, contains some bubbles, and shows no syneresis.

Example 78.

| | |
|---|---|
| Glycerine 96% | 20 ml. or 24 parts by weight |
| Ethanol (90%) - n-butanol (10%) | 15 ml. or 12 parts by weight |

| Water | 10 ml. or 10 parts by weight |
| --- | --- |
| LS-320 | 2 ml. or 2 parts by weight |
| C-O-S | 6 grams or 6 parts by weight |
| LS-320 | 8 grams or 8 parts by weight |
| Hydrogen peroxide 30% | 1 ml. or 1 part by weight |
| Texapon T Paste | 35 grams or 35 parts by weight |
| Tween 20 | 2 grams or 2 parts by weight |

The procedure in the preparation is as indicated in Example 67. Texapon T Paste (made by Henckel & Co.) reputedly contains 80-85% triethanolamine lauryl sulfate with the balance largely of inorganic sulfate and some inorganic chloride. The material is very stiff, somewhat plastic, and dark brown. About 8% by weight of free ABS acid is present in the product. Equilibrium conditions apparently bring about the liberation of free lauryl sulfuric acid from the Texapon T Paste, and some hydrochloric as well as sulfuric acid from the inorganic contaminants therein. After a period of standing the product is a light yellow, very slightly hazy, thick gel with no flow and no bubbles. There is no apparent syneresis.

Example 79.

| Glycerine | 20 ml. | (1) |
| --- | --- | --- |
| Isopropanol | 15 ml. | (2) |
| Water | 10 ml. | (3) |
| LS-320 | 2 ml. | (4) |
| C-O-S M-5 | 6.4 grams | (5) |
| LS-320 | 34.4 grams | (6) |
| $H_2O_2$ (30% solution) | 1.0 ml. | (7) |
| TEA | 13.2 grams | (8) |
| MYRJ 52 | 2.0 grams | (9) |

The first four ingredients when mixed, form a clear solution. This solution is poured onto the C-O-S with mixing until a relatively thin and clear gel is formed and air bubbles are substantially completely removed. The ingredients (6) (7) (8) and (9) are then incorporated. The surfactant (9) has an HLB number of 16.9 and is chemically polyoxyethylene (40) stearate.

Example 80.

| Pentaerythritol | 10 grams | (1) |
| --- | --- | --- |
| Glycerol | 15 grams | (2) |
| Isopropanol | 15 ml. | (3) |
| Water | 11 ml. | (4) |
| Conoco SA-597 | 2 ml. | (5) |
| C-O-S M-5 | 6.4 grams | (6) |
| Conoco SA-597 | 34.4 grams | (7) |
| TEA | 13.2 grams | (8) |
| Tween 20 | 2.0 grams | (9) |

Ingredients (1) and (2) are mixed to form a white paste. Ingredients (3), (4) and (5) are mixed and added to the paste. The C-O-S (6) is mixed in; (7) is added and stirred in. Lumps that form are broken up and (8) is added and stirred in to form a medium-thin gel, whereafter (9) is added and stirred in. Air bubbles are removed. A good gel product is obtained which is crystal-clear, not runny, and does not drip.

Example 81.

| Glycerine | 20 ml. | (1) |
| --- | --- | --- |
| Isopropanol | 15 ml. | (2) |
| Water | 10 ml. | (3) |
| Conoco SA-597 (biodegradable) | 2 ml. | (4) |
| C-O-S M-5 | 6.4 grams | (5) |
| Conoco SA-597 | 34.4 grams | (6) |
| $H_2O_2$% | 1.0 ml. | (7) |
| TEA | 13.2 grams | (8) |
| Tween 20 | 2.0 grams | (9) |

The first four ingredients are mixed and poured onto the C-O-S which is incorporated until a fairly thin, clear gel is obtained practically free from bubbles. A vacuum is applied briefly, whereupon ingredients (6), (7), (8) and (9) are added. A glass-clear, light yellow gel is obtained.

Considerable difficulty was experienced in the past in obtaining gel products of the types described, free from bubbles. While bubble-free gel products are obtainable by the processes indicated above, certain preferred sequences of steps are found to yield highly improved results. For example, in the preparation of an acid gel cleanser with ingredients including a solvent, surfactant, acid, and Cab-O-Sil, as compared with the results obtained in the sequence in which the Cab-O-Sil is added last, radically different, though preferred, results are obtained by initially adding Cab-O-Sil to a mixture of solvent and surfactant. The air in the resulting mix is removed more readily by vacuum, and air bubbles tend to break spontaneously. On prolonged standing without the use of vacuum, air eventually escapes substantially completely. Application of vacuum for a short time removes all of the air. Thereafter, acid is gently folded in, and a bubble-free product results.

Bubble-free products are further made possible by initially subjecting Cab-O-Sil to a vacuum treatment as a preliminary step. The Cab-O-Sil may be placed in a container in a vacuum desiccator. Under the subatmospheric or reduced pressure, Cab-O-Sil increases in volume somewhat, and by as much as substantially 20 to 40 percent without dust formation. The liquids of a formation are then introduced, previously mixed, but preferably in the preferred sequence indicated hereinabove. The liquids enter the interstices between the Cab-O-Sil particles, and a substantially bubble-free product results. In apparatus erected for this purpose, a container similar to a standard three-neck round bottom flask may be used with a vacuum-seal glass stirrer having a motor-driven shaft connection through the center neck. The stirrer is provided with collapsible, Teflon blades. A vacuum pump connection is provided for one side-neck, and a means similar to a separatory funnel is connected to the other side-neck. In operation, the Cab-O-Sil is measured and introduced in the container, and vacuum is applied. The liquids are measured and introduced through the funnel means in the desired sequence, with preferred, mild stirring, while applying vacuum.

In large-scale production, and without vacuum equipment, successful operations have been realized in producing substantially bubble-free gels acceptable for use, by following a sequence substantially as set forth above. In preparing a gel product with the formula of Example 65, for instance, the glycerine, propylene glycol, isopropanol, water, and the small portion of ABS acid are mixed together and then added to and mixed with the Cab-O-Sil. The main portion of the ABS acid, hydrogen peroxide, and triethanolamine are then added in succession. The resulting solution contains a fair number of bubbles. One of three methods has been used to remove these bubbles. In one method, the solution is permitted to stand quiescently, at an elevated temperature of approximately 30° to substantially 50° C. in a closed container to prevent loss of vapors. Gradually the solu-tion becomes substantially bubble-free. In the second method, the treatment is the same but in addition, the solution is very slowly stirred or mildly agitated. When left entirely quiescent as in the first method, an incipient gel structure is developed which somewhat hinders the escape of the air bubbles and retards the release thereof. In the second method, the mild agitation, which leads to coalescence of small air bubbles to form larger ones, is sufficient to prevent the formation of the incipient gel structure, with resultant lower viscosity and improved speed of air release. In the third method, the above-mentioned solution is poured onto a rotating disc to form a flowing thin film while vacuum is applied. The vacuum may be at 20 to 30 inches of mercury. The bubbles are thereby released from the solution.

Into the glass-clear and bubble-free solution is then slowly introduced and mixed the final thickening agent, such as Tween 20 and others mentioned, with caution while preventing reintroduction of air bubbles. The product is permitted to return to room temperature, and to mature fully to its final gel structure and viscosity, which usually takes several days.

In the use of hydrogen peroxide, followed by the addition of triethanolamine and Tween 20, as in the above Example 65, after producing a bubble-free mix with the first seven items in the formula, re-formation of bubbles or re-introduction of gases generally occurs readily at this point if proper precautions are not taken. The hydrogen peroxide, in particular, is apt to cause bubbling apparently because it oxidizes oxidizable substances in the mixture and also releases oxygen in the mix. Viscosity at that stage is generally relatively high and is reduced after all or sufficient peroxide and triethanolamine are added, thereby releasing bubbles. Any triethanolamine salt of the ABS acid that tends to separate out as a solid or in gelatinous form, is permitted to dissolve in the solvents. The mix is now in a relatively thin liquid state and becomes thinner at elevated temperatures, rendering easiest the release of bubbles. The application of a vacuum to a moving thin film of this mix, as heretofore described, is highly effective in the removal of bubbles. With slow introduction and mixing in of the final thickening agent, such as Tween 20, or an equivalent thickener, while preventing inclusion or entrappment of air, a bubble-free gel of attractive appearance results.

Though transparent and glass-clear products are provided as prescribed hereinabove, they may range from colorless to colored in appearance. Coloring may be added or it may be imparted by color-producing substances in ingredients employed. If the Cab-O-Sil is not free from its iron content, a gel produced therewith is apt to appear yellow though transparent, instead of water-white. In the preparation of gels containing impurities of ABS acid and other organic components, it is also possible that certain colored bodies are formed, as for instance, by oxidation by the hydrogen peroxide.

It is possible to vary the proportions of each of the different ingredients in a combination, and to avoid making a product having any one or more of the undesired characteristics including lumpiness, syneresis, graininess, free-flowing, odoriferous, and yet to provide a product with any one or more of the preferred characteristics heretofore mentioned including clearness or transparency (rather than translucency or opaqueness), freedom from bubbles, and a consistency that resists flow at normal atmospheric temperatures and yet permits the gel to be readily dispensed from a squeeze tube, and easily spread on denture surfaces. In preparing a gel, the thickness that renders it resistant to flow but readily dispensed from a squeeze tube and spreadable in a layer on denture surfaces or on a brush, serves to determine the proportions of the ingredients which form a preferred gel product. An attractive sales product can be pro-vided in a transparent, plastic dispensing tube from which a glass-clear, smooth, acid gel without undesirable odor is squeezed onto a removable denture or brush.

What is claimed is:

1. An acidic denture cleanser in the form of a gel having a refractive index of substantially 1.40 to 1.50, consisting essentially of, in a continuous phase of said gel, water, a water-soluble alcohol having two to 13 carbon atoms, a water-soluble acid selected from the group consisting of benzene sulfonic acid, toluene sulfonic acid, xylene sulfonic acid, alkyl ($C_{10}$ to $C_{15}$) sulfonic acid, alkyl ($C_{10}$ to $C_{18}$) benzene sulfonic acid, and alkyl sulfuric acid in which the alkyl radical is alauryl, cetyl or oleyl radical; an ammonium or a lower alkanolamine salt of said acid; and a hydrophilic surfactant selected from a group consisting of nonylphenol condensed with nine molecules of ethylene oxide,
polyoxyethylene (20 mols) sorbitan monooleate,
polyoxyethylene (20 mols) sorbitan monolaurate,
polyoxyethylene (4 mols) lauryl ether,
polyoxyethylene (40 mols) stearate,
polyoxyethylene (6 mols) tridecyl ether,
ethylene oxide condensation products of polyoxypropylene glycols,
sorbitan monooleate,
polyoxyethylene glycol esters of fatty acids,
soybean amine condensed with 2 mols of ethylene oxide,
oleyl amide condensed with 5 mols of ethylene oxide,
sodium oleyl methyltaurate,
monoethanolamine, diethanolamine, isopropylamine, n-hexylamine, morpholine salts of dodecylbenzene sulfonic acid,
triethanolamine salt of lauryl sulfate,
80% N-alkyl ($C_{12}$ to $C_{16}$) dimethyl benzyl ammonium chloride mixed with 20% ethanol, and
isooctylphenol polyethoxy ethanol;

and containing as a dispersed phase a colloidal pyrogenic silica of submicronic particle size having an external surface area of substantially 175 to substantially 325 square meters per gram and a refractive index substantially that of the said gel rendering the cleanser glass-clear.

2. A denture cleanser as claimed in claim 1 in which the hydrophilic surfactant in the gel is a hydrophilic, non-ionic surfactant having an HLB number above about 10.

3. An acidic denture cleanser in the form of a gel consisting essentially of, as a dispersed phase, a colloidal acidic gel having as a dispersed phase therein a colloidal pyrogenic silica of submicronic particle size having an external surface area of substantially 175 to substantially 325 square meters per gram, and having a refractive index substantially that of the surrounding medium in said gel, at least one solvent selected from the group consisting of an alcohol having two to thirteen carbon atoms, ethylene glycol, propylene glycol, ethylene glycol monoethyl ether, diethylene glycol monoethyl ether, propylene glycol methyl ether, dipropylene glycol methyl ether, polyethylene glycol, glycerine, sorbitol, mannitol, pentaerythritol, and polypropylene glycol; at least one acid selected from the group consisting of benzene sulfonic acid, toluene sulfonic acid, xylene sulfonic acid, alkyl ($C_{10}$ to $C_{15}$) sulfonic acid, alkyl ($C_{10}$ to $C_{18}$) benzene sulfonic acid, alkyl sulfuric acid in which the alkyl radical is a lauryl, cetyl or oleyl radical, hydrochloric acid, sulfuric acid, phosphoric acid, nitric acid, citric acid, formic acid, acetic acid, hydrofluoric acid, fluoboric acid, fluosilicic acid, and perchloric acid; an ammonium or a lower alkanolamine salt of said acid; at least one hydrophilic surfactant selected from a group consisting of nonylphenol condensed with nine molecules of ethylene oxide,
polyoxyethylene (20 mols) sorbitan monooleate,
polyoxyethylene (20 mols) sorbitan monolaurate,
polyoxyethylene (4 mols) lauryl ether,
polyoxyethylene (40 mols) stearate,
polyoxyethylene (6 mols) tridecyl ether,
ethylene oxide condensation products of polyoxypropylene glycols,
sorbitan monooleate,
polyoxyethylene glycol esters of fatty acids,
soybean amine condensed with 2 mols of ethylene oxide,
oleyl amide condensed with 5 mols of ethylene oxide,
sodium oleyl methyltaurate,
monoethanolamine, diethanolamine, isopropylamine, n-hexylamine, morpholine salts of dodecylbenzene sulfonic acid,
triethanolamine salt of lauryl sulfate,
80% N-alkyl ($C_{12}$ to $C_{16}$) dimethyl benzyl ammonium chloride mixed with 20% ethanol, and
isooctylphenol polyethoxy ethanol;

and water.

4. A denture cleanser having a combination of ingredients forming a gel consisting essentially of a homogeneous, uniform mixture of uncombined dodecylbenzene sulfonic acid in sufficient proportion to effect removal of tartar and other oral deposits from dentures; the triethanolamine salt of said acid, propylene glycol, isopropanol, water, a colloidal, pyrogenic silica of submicronic particle size and having an external surface area of substantially 175 to substantially 325 square meters per gram, and at least one surfactant selected from a group consisting of nonylphenol condensed with nine molecules of ethylene oxide,
polyoxyethylene (20 mols) sorbitan monooleate,
polyoxyethylene (20 mols) sorbitan monolaurate,
polyoxyethylene (4 mols) lauryl ether,
polyoxyethylene (40 mols) stearate,
polyoxyethylene (6 mols) tridecyl ether,
ethylene oxide condensation products of polyoxypropylene glycols,
sorbitan monooleate, polyoxyethylene glycol esters of fatty acids,
soybean amine condensed with 2 mols of ethylene oxide,
oleyl amide condensed with 5 mols of ethylene oxide,
sodium oleyl methyltaurate,
monoethanolamine, diethanolamine, isopropylamine, n-hexylamine, morpholine salts of dodecylbenzene sulfonic acid,
triethanolamine salt of lauryl sulfate,
80% N-alkyl ($C_{12}$ to $C_{16}$) dimethyl benzyl ammonium chloride mixed with 20% ethanol, and isooctylphenol polyethoxy ethanol;
the said cleanser being a stable, acidic gel, easily removable from removable dentures by rinsing with water without leaving an objectionable after-taste, readily dispensed from a squeeze tube and spreadable in a layer on denture surfaces, and the refractive index of the said silica approaching that of the surrounding medium in the gel to render the cleanser transparent and glass-clear.

5. A denture cleanser having a combination of ingredients in a transparent, glass-clear product consisting essentially of propylene glycol, dodecylbenzene sulfonic acid sufficient in amount to effect the removal of tartar and other oral deposits from dentures; a colloidal, pyrogenic silica of submicronic particle size and having an external surface are of substantially 175 to substantially 325 square meters per gram, and a surfactant sufficient in amount to effect a thickening of the mix of said ingredients, the said surfactant selected from a group consisting of
nonylphenol condensed with nine molecules of ethylene oxide,
polyoxyethylene (20 mols) sorbitan monooleate,
polyoxyethylene (20 mols) sorbitan monolaurate,
polyoxyethylene (4 mols) lauryl ether,
polyoxyethylene (40 mols) stearate,
polyoxyethylene (6 mols) tridecyl ether,
ethylene oxide condensation products of polyoxypropylene glycols,
sorbitan monooleate,
polyoxyethylene glycol esters of fatty acids,
soybean amine condensed with 2 mols of ethylene oxide,
oleyl amide condensed with 5 mols of ethylene oxide,
sodium oleyl methyltaurate,
monoethanolamine, diethanolamine, isopropylamine, n-hexylamine, morpholine salts of dodecylbenzene sulfonic acid,
triethanolamine salt of lauryl sulfate,
80% N-alkyl ($C_{12}$ to $C_{16}$) dimethyl benzyl ammonium chloride mixed with 20% ethanol, and
isooctylphenol polyethoxy ethanol;
the refractive index of the said silica approaching that of the surrounding medium in the gel to render the cleanser transparent and glass-clear.

6. A denture cleanser having a combination of ingredients consisting essentially of an acid selected from a group consisting of alkyl ($C_{10}$ to $C_{15}$) sulfonic acid, alkyl ($C_{10}$ to $C_{18}$) benzene sulfonic acid, alkyl sulfuric acid in which the alkyl radical is a lauryl, cetyl or oleyl radical, benzene sulfonic acid, toluene sulfonic acid, xylene sulfonic acid, sulfamic acid, hydrochloric acid, sulfuric acid, phosphoric acid, nitric acid, citric acid, formic acid, acetic acid, hydrofluoric acid, fluoboric acid, fluosilicic acid, and perchloric acid; at least one solvent selected from a group consisting of an alcohol having a chain length of two to 13 carbon atoms, propylene glycol, glycerine, ethylene glycol monoethyl ether, diethylene glycol monoethyl ether, propylene glycol methyl ether, dipropylene glycol methyl ether, polyethylene glycol, polypropylene glycol, mannitol, sorbitol, and pentaerythritol; and a colloidal, pyrogenic silica of submicronic particle size and having an external surface area of substantially 175 to substantially 325 square meters per gram, the said cleanser consisting of an acidic gel having a sufficient proportion of acid to effect removal of tartar and other oral deposits from dentures, and the refractive index of the said silica approaching that of the surrounding medium in the gel to render the cleanser transparent and glass-clear.

7. A denture cleanser consisting essentially of a combination of dodecylbenzene sulfonic acid, at least one solvent selected from a group consisting of an alcohol having a chain length of two to thirteen carbon atoms, propylene glycol, glycerine, ethylene glycol monoethyl ether, diethylene glycol monoethyl ether, propylene glycol methyl ether, dipropylene glycol methyl ether, polyethylene glycol, polypropylene glycol, mannitol sorbitol, and pentaerythritol; and a colloidal, pyrogenic silica of submicronic particle size and having an external surface area of substantially 175 to substantially 325 square meters per gram, the said cleanser consisting of a gel, resistant to flow but readily dispensed from a squeeze tube and spreadable in a layer on denture surfaces, and the refractive index of the said silica approaching that of the surrounding medium in the gel to render the cleaner transparent and glass-clear.

8. A denture cleanser consisting essentially of a surfactant selected from a group consisting of
nonylphenol condensed with nine molecules of ethylene oxide,
polyoxyethylene (20 mols) sorbitan monooleate,
polyoxyethylene (20 mols) sorbitan monolaurate,
polyoxyethylene (4 mols) lauryl ether,
polyoxyethylene (40 mols) stearate,
polyoxyethylene (6 mols) tridecyl ether,
ethylene oxide condensation products of polyoxypropylene glycols,
sorbitan monooleate,
polyoxyethylene glycol esters of fatty acids,
soybean amine condensed with 2 mols of ethylene oxide,
oleyl amide condensed with 5 mols of ethylene oxide,
sodium oleyl methyltaurate,
monoethanolamine, diethanolamine, isopropylamine, n-hexylamine, morpholine salts of dodecylbenzene sulfonic acid,
triethanolamine salt of lauryl sulfate,
80% N-alkyl ($C_{12}$ to $C_{16}$) dimethyl benzyl ammonium chloride mixed with 20% ethanol, and
isooctylphenol polyethoxy ethanol;
an acid selected from a group consisting of alkyl ($C_{10}$ to $C_{15}$) sulfonic acid, alkyl ($C_{10}$ to $C_{18}$) benzene sulfonic acid, alkyl sulfuric acid in which the alkyl radical is a lauryl, cetyl or oleyl radical, benzene sulfonic acid, toluene sulfonic acid, xylene sulfonic acid, sulfamic acid, hydrochloric acid, sulfuric acid, phosphoric acid, nitric acid, citric acid, formic acid, acetic acid, hydrofluoric acid, fluoboric acid, fluosilicic acid, and perchloric acid; and a colloidal, pyrogenic silica of submicronic particle size and having an external surface area of substantially 175 to substantially 325 square meters per gram, the said cleanser consisting of an acidic gel having a sufficient proportion of said acid to effect removal of tartar and other oral deposits from dentures, and the refractive index of the said silica approaching that of the surrounding medium in the gel to render the cleanser transparent and glass-clear.

9. A denture cleanser consisting of a substantially syneresis-free, transparent, glass-clear gel having in combination, alkyl benzene sulfonic acid in which the alkyl group is a chain containing 10 to 18 carbon atoms, an amine salt thereof, glycerine, a monohydric alcohol having a carbon atom chain length of two to thirteen carbon atoms; and a colloidal, pyrogenic silica of submicronic particle size, the said cleanser having said acid in sufficient proportion to remove tartar and other oral deposits from dentures, and the refractive index of the said silica approaching that of the surrounding medium in the gel to render the cleanser transparent and glass-clear.

10. A denture cleanser composition in the form of a gel consisting essentially of a homogeneous, uniform mixture of alkyl benzene sulfonic acid in which the alkyl group is a chain containing 10 to 18 carbon atoms, the triethanolamine salt of said acid, at least one alcohol having a carbon atom chain length of two to thirteen carbon atoms, and a colloidal, pyrogenic silica of submicronic particle size and having an external surface area of substantially 175 to substantially 325 square meters per gram, the said cleanser being a stable, transparent, glass-clear, acidic gel, easily removable from removable dentures by rinsing with water without leaving an objectionable after-taste, and readily dispensed from a squeeze tube and spreadable in a layer on denture surfaces, the said cleanser having said acid in sufficient proportion to remove tartar and other oral deposits from dentures, and the refractive index of the said silica approaching that of the surrounding medium in the gel to render the cleanser transparent and glass-clear.

11. A method of preparing a denture cleanser that cleans artificial dentures and removes mucin plaques therefrom, the said method comprising mixing together at least one solvent selected from a group consisting of an alcohol having a chain length of two to thirteen carbon atoms, propylene glycol, glycerine, ethylene glycol monoethyl ether, diethylene glycol monoethyl ether, propylene glycol methyl ether, dipropylene glycol methyl ether, polyethylene glycol, polypropylene glycol, mannitol, sorbitol, and pentaerythritol; and a small portion of the total amount of acid used in the cleanser, the said acid selected from at least one of a group consisting of alkyl ($C_{10}$ to $C_{18}$) sulfonic acid, alkyl ($C_{10}$ to $C_{18}$) benzene sulfonic acid, alkyl sulfuric acid in which the alkyl radical is a lauryl, cetyl or oleyl radical, benzene sulfonic acid, toluene sulfonic acid, xylene sulfonic acid, and sulfamic acid; stirring together the resulting mix and a colloidal, pyrogenic silica of submicronic particle size, and permitting air to escape, the said portion of said acid being sufficient to avoid undue thickening and stiffening of the mix; thereafter, in succession, slowly stirring in the balance of the said acid, stirring in slowly triethanolamine sufficient to combine with a portion of said acid, and stirring in surfactant selected from a group consisting of
 nonylphenol condensed with nine molecules of ethylene oxide,
 polyoxyethylene (20 mols) sorbitan monooleate,
 polyoxyethylene (20 mols) sorbitan monolaurate,
 polyoxyethylene (4 mols) lauryl ether,
 polyoxyethylene (40 mols) stearate,
 polyoxyethylene (6 mols) tridecyl ether,
 ethylene oxide condensation products of polyoxypropylene glycols,
 sorbitan monooleate,
 polyoxyethylene glycol esters of fatty acids,
 soybean amine condensed with 2 mols of ethylene oxide,
 oleyl amide condensed with 5 mols of ethylene oxide,
 sodium oleyl methyltaurate,
 triethanolamine salt of dodecylbenzene sulfonic acid,
 monoethanolamine, diethanolamine, isopropylamine, n-hexylamine, morpholine salts of dodecylbenzene sulfonic acid,
 triethanolamine salt of lauryl sulfate,
 80% N-alkyl ($C_{12}$ to $C_{16}$) dimethyl benzyl ammonium chloride mixed with 20% ethanol, and
 isooctylphenol polyethoxy ethanol;
whereby a transparent, crystal-clear, stable gel is formed which is flow-resistant but readily dispensed from a squeeze tube and spreadable in a layer on denture surfaces.

12. A method of preparing a denture cleanser, subjecting a mix of water; at least one organic solvent selected from a group consisting of an alcohol having a chain length of two to thirteen carbon atoms, propylene glycol, glycerine, ethylene glycol monoethyl ether, diethylene glycol monoethyl ether, propylene glycol methyl ether, dipropylene glycol methyl ether, polyethylene glycol, polypropylene glycol, mannitol, sorbitol, and pentaerythritol; acid selected from a group consisting of alkyl ($C_{10}$ to $C_{18}$) sulfonic acid, alkyl ($C_{10}$ to $C_{18}$) benzene sulfonic acid, alkyl sulfuric acid in which the alkyl radical is a lauryl, cetyl or oleyl radical, benzene sulfonic acid, toluene sulfonic acid, xylene sulfonic acid, sulfamic acid, hydrochloric acid, sulfuric acid, phosphoric acid, nitric acid, citric acid, formic acid, acetic acid, hydrofluoric acid, fluoboric acid, fluosilicic acid, and perchloric acid; colloidal, pyrogenic silica of submicronic particle size; hydrogen peroxide, and triethanolamine, to elevated temperature in the approximate range of 30° to 50° C. to remove bubbles from the mix, and in said mix introducing a surfactant to thicken the mix while avoiding reintroduction of air, said surfactant selected from a group consisting of
 nonylphenol condensed with nine molecules of ethylene oxide,
 polyoxyethylene (20 mols) sorbitan monooleate,
 polyoxyethylene (20 mols) sorbitan monolaurate,
 polyoxyethylene (4 mols) lauryl ether,
 polyoxyethylene (40 mols) stearate,
 polyoxyethylene (6 mols) tridecyl ether,
 ethylene oxide condensation products of polyoxypropylene glycols,
 sorbitan monooleate,
 polyoxyethylene glycol esters of fatty acids,
 soybean amine condensed with 2 mols of ethylene oxide,
 oleyl amide condensed with 5 mols of ethylene oxide,
 sodium oleyl methyltaurate,
 monoethanolamine, diethanolamine, isopropylamine, n-hexylamine, morpholine salts of dodecylbenzene sulfonic acid,
 triethanolamine salt of lauryl sulfate,
 80% N-alkyl ($C_{12}$ to $C_{16}$) dimethyl benzyl ammonium chloride mixed with 20% ethanol, and
 isooctylphenol polyethoxy ethanol;
to provide a transparent, glass-clear, bubble-free, acid gel.

13. A method of preparing a denture cleanser that cleans artificial dentures and removes mucin plaques therefrom, the said method comprising mixing together at least one solvent selected from a group consisting of an alcohol having a chain length of two to thirteen carbon atoms, propylene glycol, glycerine, ethylene glycol monoethyl ether, diethylene glycol monoethyl ether, propylene glycol methyl ether, dipropylene glycol methyl ether, polyethylene glycol, polypropylene glycol, mannitol, sorbitol, and pentaerythritol; and a small portion of the total amount of acid used in the cleanser; the said acid selected from at least one of a group consisting of alkyl ($C_{10}$ to $C_{18}$) sulfonic acid, alkyl ($C_{10}$ to $C_{18}$) benzene sulfonic acid, alkyl sulfuric acid in which the alkyl radical is a lauryl, cetyl or oleyl radical, benzene sulfonic acid, toluene sulfonic acid, xylene sulfonic acid, and sulfamic acid; stirring together the resulting mix and a colloidal, pyrogenic silica of submicronic particle size, and permitting air to escape, the said portion of said acid being sufficient to avoid undue thickening and stiffening of the mix; thereafter, in succession, slowly stirring in the balance of the said acid, stirring in slowly a basic, water-soluble amine sufficient to combine with a portion of said acid, and stirring in a surfactant selected from a group consisting of
 nonylphenol condensed with nine molecules of ethylene oxide,
 polyoxyethylene (20 mols) sorbitan monooleate,
 polyoxyethylene (20 mols) sorbitan monolaurate,
 polyoxyethylene (4 mols) lauryl ether,
 polyoxyethylene (40 mols) stearate,
 polyoxyethylene (6 mols) tridecyl ether,
 ethylene oxide condensation products of polyoxypropylene glycols,
 sorbitan monooleate,
 polyoxyethylene glycol esters of fatty acids,
 soybean amine condensed with 2 mols of ethylene oxide,
 oleyl amide condensed with 5 mols of ethylene oxide,
 sodium oleyl methyltaurate,
 monoethanolamine, diethanolamine, isopropylamine, n-hexylamine, morpholine salts of dodecylbenzene sulfonic acid,
 triethanolamine salt of lauryl sulfate,
 80% N-alkyl ($C_{12}$ to $C_{16}$) dimethyl benzyl ammonium chloride mixed with 20% ethanol, and isooctylphenol polyethoxy ethanol;
whereby a stable gel is formed which is flow-resistant but readily dispensed from a squeeze tube and spreadable in a layer on denture surfaces.

14. A method of preparing a denture cleanser comprising mixing a water-soluble solvent selected from a group consisting of an alcohol having a chain length of two to thirteen carbon atoms, propylene glycol, glycerine, ethylene glycol monoethyl ether, diethylene glycol monoethyl ether, propylene glycol methyl ether, dipropylene glycol methyl ether, polyethylene glycol, polypropylene glycol, mannitol, sorbitol, and pentaerythritol; and an alkyl ($C_{10}$ to $C_{18}$) benzene, toluene or xylene sulfonic acid; gradually adding to the mix a colloidal, pyrogenic silica of submicronic particle size having an external surface area of substantially 175 to substantially 325 square meters per gram while stirring until a thick gel without lumps is formed, adding and mixing in hydrogen peroxide, stirring in additional acid, adding to the gel formed, triethanolamine while stirring, permitting the resulting mix to cool, and passing the cooled mix in a thin film-like layer through a vacuumized zone to remove bubbles from the gel, and finally adding a surfactant selected from a group consisting of nonylphenol condensed with nine molecules of ethylene oxide,
polyoxyethylene (20 mols) sorbitan monooleate,
polyoxyethylene (20 mols) sorbitan monolaurate,
polyoxyethylene (4 mols) lauryl ether,
polyoxyethylene (40 mols) stearate,
polyoxyethylene (6 mols) tridecyl ether,
ethylene oxide condensation products of polyoxypropylene glycols,
sorbitan monooleate,
polyoxyethylene glycol esters of fatty acids,
soybean amine condensed with 2 mols of ethylene oxide,
oleyl amide condensed with 5 mols of ethylene oxide,
sodium oleyl methyltaurate,
monoethanolamine, diethanolamine, isopropylamine, n-hexylamine, morpholine salts of dodecylbenzene sulfonic acid,
triethanolamine salt of lauryl sulfate,
80% N-alkyl ($C_{12}$ to $C_{16}$) dimethyl benzyl ammonium chloride mixed with 20% ethanol, and
isooctylphenol polyethoxy ethanol;

to serve to deagglomerate the silica in the batch and to bring about final thickening thereof, to form by said method a transparent, glass-clear, acidic gel that removes tartar and other oral deposits from dentures.

* * * * *

UNITED STATES PATENT OFFICE
CERTIFICATE OF CORRECTION

Patent No. 3,652,420          Dated March 28, 1972

Inventor(s) William H. Hill

It is certified that error appears in the above-identified patent and that said Letters Patent are hereby corrected as shown below:

On the cover sheet [57] in the ABSTRACT, line 5, "combination" should read -- combinations -- . Column 5, line 4, "the" should read -- a -- . Column 6, in Table 1, with reference to "Solvent, amount" in Ex. No. 9, "7" should read -- 7 ml. -- . Column 7, in Table 1, with reference to "Ex. No. 19", under "Surfactant, amount", "(no other liquid used." should read -- (no other liquid used) -- ; line 30, "$H_2N\cdot SO\cdot OH$" should read -- $H_2N\cdot SO_2\cdot OH$ -- ; Column 12, line 2, "$H_2O_0$" should read -- $H_2O_2$ -- . Column 13, "Example 47" should read as follows:

| | | |
|---|---|---|
| PG | 20 ml. | |
| Ethanol (pure grain, 190 proof) | 19 ml. | |
| Water | 12 ml. | (instead of 13, |
| LS-320 | 2 ml. | to compensate for |
| C-O-S | 6.4 grams | water in the |
| LS-320 | 34.4 grams | alcohol) -- . |

Column 17, line 63, "y" should be canceled. Column 18, in "Example 68" in the column with the proportions of the ingredients, "320 grams" should read -- 21 grams -- . Column 20, line 35, "between 20" should read -- Tween 20 -- ; line 56, "cloudi-ness" should read -- cloudiness -- . Column 23, line 42, "pro-vided" should read -- provided -- . Column 24, lines 13 and 14, cancel "a colloidal acidic gel having as a dispersed phase therein" . Column 26, line 8, after "mannitol" insert a comma -- , -- ; line 15, "cleaner" should read -- cleanser -- .

Signed and sealed this 26th day of December 1972.

(SEAL)
Attest:

EDWARD M. FLETCHER, JR.          ROBERT GOTTSCHALK
Attesting Officer          Commissioner of Patents